United States Patent [19]

Bleckmann et al.

[11] Patent Number: 4,764,685
[45] Date of Patent: Aug. 16, 1988

[54] METHOD AND CIRCUIT CONFIGURATION FOR PROCESSING THE OUTPUT SIGNALS OF A ROTATIONAL SPEED SENSOR

[75] Inventors: Hans W. Bleckmann, Bad Nauheim; Heinz Loreck, Frankfurt am Main; Michael Zydek, Langgoens/Cleeberg, all of Fed. Rep. of Germany

[73] Assignee: Alfred Teves GmbH, Frankfurt am Main, Fed. Rep. of Germany

[21] Appl. No.: 937,067

[22] Filed: Dec. 2, 1986

[30] Foreign Application Priority Data

Dec. 5, 1985 [DE] Fed. Rep. of Germany ....... 3543058

[51] Int. Cl.⁴ ............................................. G01P 3/42
[52] U.S. Cl. .................................... 307/106; 307/108; 307/120; 324/160; 324/161; 324/162
[58] Field of Search ...................... 317/106, 108, 120; 324/160–178; 340/52 B, 870.37; 180/197, 170, 171; 318/326, 327, 138, 341, 314, 254; 361/236, 239, 240, 242, 244, 241

[56] References Cited

U.S. PATENT DOCUMENTS

| | | | |
|---|---|---|---|
| 3,649,871 | 3/1972 | Klein et al. | 324/162 X |
| 3,762,495 | 10/1973 | Usui et al. | 324/162 X |
| 3,803,425 | 4/1974 | Carp | 324/161 X |
| 3,820,712 | 6/1974 | Oswald | 324/160 X |
| 3,920,284 | 11/1975 | Lane et al. | 324/161 X |
| 4,085,363 | 4/1978 | Gravina et al. | 324/162 |
| 4,138,728 | 2/1979 | Tung | 324/160 X |
| 4,142,153 | 2/1979 | Smith | 324/166 X |
| 4,184,114 | 1/1980 | Minakuchi | 324/161 |
| 4,199,800 | 4/1980 | Weit | 361/239 |
| 4,455,555 | 6/1984 | Symonds et al. | 324/176 X |
| 4,463,296 | 7/1984 | Tada et al. | 318/452 |
| 4,546,437 | 10/1985 | Bleckmann et al. | 364/426 |
| 4,611,154 | 9/1986 | Lambropoulos et al. | 324/177 X |

FOREIGN PATENT DOCUMENTS 2003610 3/1979 United Kingdom .
1558209 12/1979 United Kingdom .
2114753 8/1983 United Kingdom .

Primary Examiner—William M. Shoop, Jr.
Assistant Examiner—Paul Ip
Attorney, Agent, or Firm—James B. Raden; Robert P. Seitter

[57] ABSTRACT

To process the output signal of a rotational speed sensor (2) which generates an alternating voltage dependent in respect of frequency and amplitude on the rotational speed, two low-pass filters (TP1, TP2) serve to produce a useful signal (I1), on the one hand, and a reference signal (I2), on the other hand. The two signals are compared. In dependence on the difference of these signals (I1, I2) a pulse-shaped output signal, namely the processed sensor signal, is generated by means of a comparator (7). The reference signal dynamically follows the useful signal with the aid of a control signal issue by an adapter circuit (20,21).

9 Claims, 2 Drawing Sheets

METHOD AND CIRCUIT CONFIGURATION FOR PROCESSING THE OUTPUT SIGNALS OF A ROTATIONAL SPEED SENSOR

BACKGROUND OF THE INVENTION

The present invention relates to a method for processing the output signal of a rotational speed sensor which is present in the form of an alternating voltage whose frequency and amplitude are a function of the rotational speed. Using the method in an input circuit, the high-frequency interfering signals are attenuated and the useful signal is amplified and transformed into a pulse-shaped output signal. Circuit configurations with low-pass filters for the attenuation of high-frequency interfering signals as well as with amplifying and pulse-generating circuits are utilized in the present invention.

Methods and circuit configurations of this type are know which are used in automotive vehicles with electronic brake slip control (German published patent application No. 32 34 637). In such brake systems, the information about the wheel rotational behavior required for the control is obtained by means of the rotational speed sensors. To this end, for instance a disc co-rotating with the wheel or with the drive shaft is used, which disc is toothed at its periphery and which coacts with a stationary inductive pick-up for measuring data which issues an alternating voltage having a frequency proportional to the wheel rotational speed. This is because owing to the toothing of the ferromagnetic toothed disc passing by the sensor, a magnetic flux generated by a permanent magnet is varied periodically, with the result that an alternating voltage is induced in the measuring coil of this sensor, the frequency of which is proportional to the velocity of the wheel. The sensor signals will then be processed in a trigger circuit, that is amplified and transformed into a binary square-wave signal. Additionally, the trigger circuits contain filters by which interfering signals are attenuated to the greatest extent possible.

When using such measuring arrangements, difficulties arise in that the amplitudes of the induced voltages and, consequently, the output voltages of the sensors are dependent on the rotational speed and become very weak in the presence of slow vehicle speed and wheel speed. In order to minimize the high-frequency interfering signals as well as the low-frequency voltage fluctuations caused by dividing errors of the gear wheel, eccentricity of the wheel or eccentric support of the wheel etc. to such extent as to manage in the evaluation to obtain an isolation form the useful signal, that means the speed-responsive signal, a major expediture is required. For example, the conduit leading from the rotational speed sensor to the electronic processing circuit must be bridged by shielded lines. The mechanical tolerances of toothed disc and sensor must be limited to the still admissible valves by finishing and adjusting operations. This increases the manufacturing effort significantly because at least three or four sensors are required for precise brake slip control.

Therefore, it is an object of the present invention to overcome the described shortcomings in measuring the rotational speed and processing the measuring signals and to device a method as well as circuit configurations which permit processing even relatively weak sensor signals affected by high-frequency and very low-frequency interferences. That is, exact distinction between useful signals and interfering signals must be rendered possible even under such unfavorable conditions as prevailing in particular at a low rotational speed.

This object is achieved in a surprisingly simple fashion in that, according to the instant invention, in a method of the type referred to, a reference signal is formed in the input circuit by means of a low-pass filter, with the limit frequency being below the useful frequency range, in that the useful signal is compared with the reference signal and in that, as a function of the difference between these two signals, the pulse-shaped output signal is generated which represents the processed sensor signal.

The special design of a circuit configuration for implementing the method resides in a smoothing filter which is inserted into the input circuit, namely between the rotational speed sensor and the amplifying and pulse-generating circuits, which smoothing filter contains the low-pass filter for attenuating the high-frequency interfering signals and forming the useful signal, as well as a low-pass filter for obtaining a reference signal, and in that the signals obtained by means of the two low-pass filters, namely the useful signal and the reference signal, can be supplied to a comparator whose output signal represents the processed sensor signal.

The advantages of the present invention, when used for a slip-controlled vehicular brake system, are above all the reduced expenditure for measuring the wheel speeds and for transmitting this information to the associated electronic control unit. As the present invention permits unambiguous distinction between the useful signal representative of the rotational speed even in the presence of a low amplitude and the high-frequency interfering signals and the voltage fluctuations due to eccentricities etc., comparatively simple rotational speed sensors will suffice which, moreover, admit greater manufacturing and assembling tolerances. Instead of shielded lines, unshielded lines may be used to connect the sensors to the electronics. The results of all this are considerably less manufacturing efforts as well as improved functioning.

According to an expedient embodiment of the inventive method, when forming the digital output signal, a hysteresis will be created between the control signal, that is the difference between the useful signal and the reference signal, and the change-over of the output signal.

Another important embodiment of this invention resides in that the reference signal, as soon as the difference between the useful signal level and the reference signal level exceeds a predetermined threshold value, will dynamically follow the useful signal. This is of particular significance for the dimensioning of the filters in the input circuit what will be explained in more detail hereinbelow.

The limit frequency of the low-pass filter for the attenuation of the interfering signals and for the formation of the useful signals suitable is within the effective frequency range and is chosen such that, above the limit frequency, the amplitudes of the useful signals which rise at the output of the rotational speed sensor proportional to the rotational speed are approximately the same.

In another embodiment of the inventive circuit configuration, the useful signal and the reference signal can be delivered to the two inputs of a comparator. Expediently, impedance transformers are inserted between the low-pass filters and the comparator.

Another embodiment of the instant invention resides in that a resistor is interposed in the signal lines between the impedance transformers and the comparator, on which resistor a difference voltage can be generated by means of a difference amplifier controlled by the output signal of the comparator and by means of a current mirror circuitry, which difference voltage is opposed to the actuating signal of the comparator, i.e. the difference between the useful signal and the reference signal, and thereby causes the switching hysteresis.

Furthermore, the reference signal can be variable as a function of the amplitude of the useful signal. By means of an adapter circuit which starts to function after a predetermined threshold value, that is the difference value between the useful signal level and the reference signal level, has been exceeded, the reference signal can dynamically follow the useful signal. To generate the difference threshold value decisive for the follow-up, a resistor can be inserted into the signal line leading to the adapter circuit, on which resistor a threshold voltage opposing the useful signal can be generated by means of a current mirror circuitry and a difference amplifier controlled by the output signal of the comparator.

The adapter circuit may comprise a proportional amplifier which, by way of a network connected downstream, generates a control variable which is dependent on the difference between the useful signal level and the reference signal level and which can be fed back to the low-pass filter circuit forming the reference signal.

According to another embodiment of the inventive circuit configuration, for the self-monitoring of its operability, there is provision of a supplement circuit which initiates inherent oscillation of the evaluating circuit with a frequency that is below the useful frequency range. Upon the occurrence of a short-circuit or interruption of the signals leading to the rotational speed sensor, the supplement circuit will stop the inherent oscillation.

The supplement circuit, expediently, possesses a counter constantly stepped by means of an oscillator or a clock generator, which counter can be reset by the output signal of the comparator and which, on attainment of a predetermined digit, by way of pulse generator will introduce a pulse similar to a useful signal into the input circuit and thereby will initiate a pulse at the output of the comparator that resets the counter. This way, the entire trigger circuit will be dynamically checked for operability as long as the vehicle stands still and no wheel sensor pulse is generated.

Besides, to monitor the circuit configuration according to the present invention a constant current source may be provided which causes a distribution of voltage in an input network which, in the event of interruption of the line leading to the rotational speed sensor or a short-circuit, exceeds limit values and thereby stops the inherent oscillation and/or the input of pulses into the input circuit which causes the inherent oscillation.

Hence, it follows that the inventive supplement circuit results in discontinuance of the inherent oscillation and thus in an error indication both on the occurrence of a short-circuit in the sensor circuit and a defect in the evaluating circuit. No additional signal lines or other auxiliary means are required for this purpose, which therefore represents a major progress compared to know systems of this type.

BRIEF DESCRIPTION OF THE DRAWING

Further features, advantages and application of the present invention can be gathered from the following description of embodiments of the invention by way of the accompanying drawing wherein.

DETAILED DESCRIPTION

Figure 1:
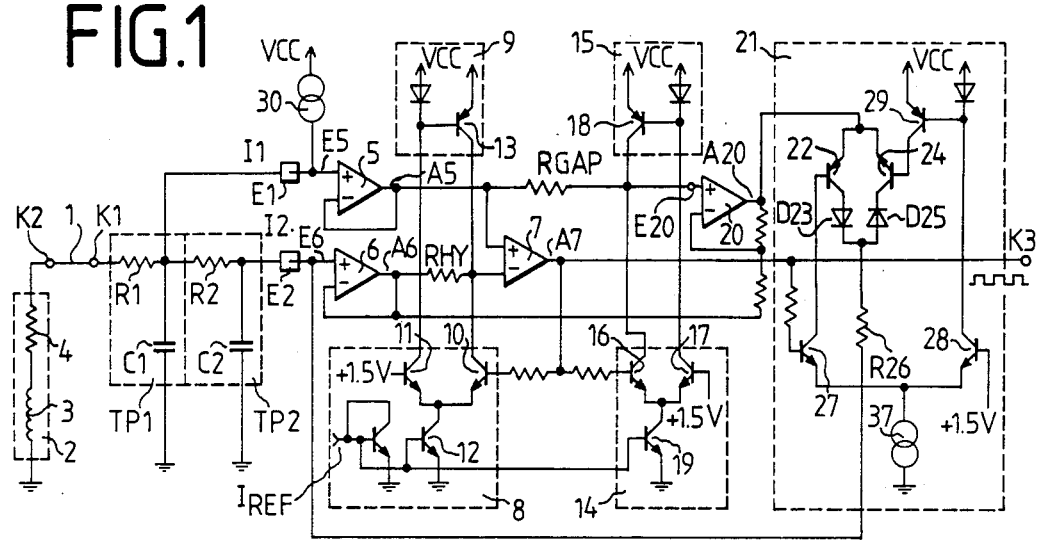
FIG. 1 is the electric wiring diagram of a circuit configuration according to the invention connected to a rotational speed sensor.

According to the embodiment of FIG. 1, the circuit configuration of the present invention comprises an input circuit with two low-pass filters TP1, TP2 which each are composed of an ohmic series resistance R1 and R2, respectively, and a condensator C1 and C2, respectively, by way of which a current path leads to earth ground. A rotational speed sensor 2 is connected to input terminal K1 via a signal line, herein an unshielded cable 1. Reference numeral 3 symbolizes the inductivity, 4 the ohmic internal resistance of the rotational speed sensor 2, at the connecting terminal K2 of which an alternating voltage can be tapped containing the information about the rotational speed to be measured.

Herein, the two low-pass filters TP1, TP2 each consist of a voltage divider R1, C2 connected in series. The ratio of the alternating-current resistors of R1 to C1 is chosen such that C1 practically means a short-circuit for high-frequency interfering signals, but not for signals in the useful frequency range. The alternating-current resistor of C2 in comparison to R2, however, is low even for useful signals, to such effect of allowing only signals with the very low frequency of several hertz, as is caused for example, by an eccentric support of the toothed disc inducing the pulses, to reach the terminal E2. In contrast thereto, the useful signal freed from the high-frequency interfering signals is applied to the terminal E1.

The output signals of the low-pass filters TP1, TP2 are supplied via impedance transformers 5, 6, herein analog amplifiers with feedback, to a comparator 7, at the output A7 of which the pulse-shaped output signal is present which represents the processed sensor signal, namely the test signal of the sensor 2, and which can be tapped from terminal K3 for further processing. Herein, this signal is a binary signal since solely the switch conditions 'high' (H) and 'low' (L) of comparator 7 are rated.

That means, the comparator 7 compares the useful signal present at output A5 of the transformer 5 with the output signal of transformer 6 which serves as a reference signal. However, it is still necessary when forming the signal difference to consider the voltage drop on a resistor RHY which, on change of signal of the difference voltage, delays the change-over of the comparator 7 and thus generates a hysteresis. For this purpose, a hysteresis voltage will be produced at the resistor RHY by means of the difference amplifier 8 governed by the output signal of comparator 7 and by means of the current mirror circuitry 9. This is because as long as the useful signal at output A5 exceeds the reference signal at A6 pulse the hysteresis voltage RHY and hence an H-signal is present at output A7 of the comparator 7, the transistor 10 of the difference amplifier 8 is conducting, whilst the second transistor 11 of the amplifier 8 is non-conductive, so that a current of constant magnitude is supplied from the impedance transformer 6 by way of the hysteresis resistor RHY, by way of the transistor 10 and via the transistor 12 in the emitter of the difference amplifier 8, which current generates the hysteresis voltage on RHY. $I_{REF}$ symbolizes a base current of constant magnitude which causes in a known fashion in integrated circuits of the type used herein a constant collector current in the transistor 12 and in the transistors connected in parallel. In this phase, also the transistor 13 of the current mirror circuitry 9 is de-energized due to the transistor 11 being non-conductive.

After the change of signals at the inputs of comparator 7 and change-over of this comparator, the difference amplifier 8 is changed over by the L-signal at output A7. Now hysteresis current of predetermined magnitude flows via the transistor 13 of the current mirror circuitry 9 to the impedance transformer 6 and generates a hysteresis voltage of reverse direction on the hysteresis resistor RHY. In this phase, too, the hysteresis voltage is thus opposing the useful signal available at output A5.

A difference amplifier 14, similar to the amplifier 8, with the associated current mirror circuitry 15, which resembles the circuitry 9, serves to generate a useful-signal threshold value on an ohmic resistor RGAP. Again, in the presence of an H-signal at output A7 of the comparator 7, a transistor 16 of the amplifier 14 will be placed in conduction, and a current flow of predetermined magnitude will be supplied from the impedance transformer 5 via the resistor RGAP and via the transistors 16, 19 thereby. The transistor 18 of the current mirror circuitry 15 is in this phase non-conductive like the second transistor 17 of the amplifier 14 whose base is maintained on a predetermined potential. In contrary thereto, an L-signal at output A7 of the comparator 7 results in non-conduction of the transistor 16, conduction of the transistors 17 and 18 and thereby delivery of a current of predetermined magnitude via the collector of the transistor 18, by way of the resistor RGAP determining the threshold value, to the impedance transformer 5.

By way of another amplifier 20, at whose input E20 the useful signal reduced by the voltage drop on RGAP is applied, as well as by way of a network 21 connected downstream, inventively, the reference signal will dynamically follow the useful signal. To this end, depending on the sign of the voltage at output A20 of the amplifier 20, either via a transistor 22 and a diode D23 or by way of a transistor 24 and a diode D25 as well as by way of a resistor R26, a control variable dependent on the useful signal, herein a current proportional to the useful signal, will be generated and fed back to the input E6 of the impedance transformer 6 for follow-up of the reference signal. The current path by way of the transistor 22 and the diode 23 or by way of the transistor 24 and the diode 25 of the network 21 is likewise controlled by means of the output signal present at the output A7 of the comparator 7 and by way of the transistors 27, 28 and 29. As long as an H-signal is applied at the output A7, the transistor 27 is in a conductive state, and thereby a current path is released by way of the transistor 22 and the diode 23, while an L-signal at the output A7 admits a current flow by way of the transistors 28 and 29 so that the current path by way of the transistor 24 and the diode D25 will be released. A constant current source 37 is inserted into the emitter circuit of the transistors 27, 28.

The adapter circuit for the dynamic follow-up of the reference signal is thus substantially composed of the analog amplifier 20 and the network 21 connected downstream thereof which generates the control variable adapted to be fed back.

Figure 3:
FIG. 3 shows alike the illustration of FIG. 2 the simultaneous signal course I1 at E3.

A constant current source 30 at the input of the impedance transformer 5 which processes the useful signal serves, on the one hand, to adjust the operating point of the transformer 5 and, on the other hand, as is described in FIG. 3, to produce a distribution of voltage in the input circuit which allows to detect when the connection to the sensor 2 is interrupted or when there is a short-circuit.

To supply the circuitry according to FIG. 1 with energy, a source VCC is provided which is positive in relation to the earth connection. The connecting lines for the power supply are characterized by an arrow. The diagrams in FIGS. 2 to 5 serve to explain the mode of operation of the circuitry according to FIG. 1.

Figure 2:
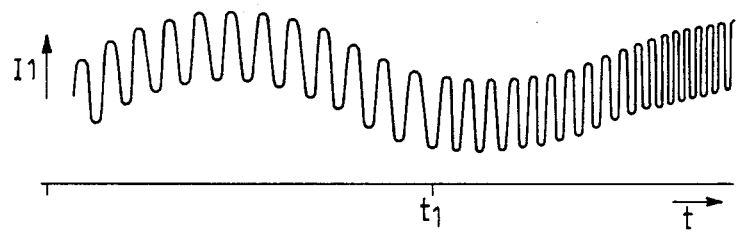
FIG. 2 is a simplified diagram of the signal course I1 at terminal E1.

FIGS. 2 and 3 refer to a situation in which the wheel whereat the sensor 2 is mounted first rotates with a medium, approximately constant speed and is accelerated roughly at the point of time $t_1$. At input E5, a useful signal I1 freed from high-frequency interfering signals by the low-pass filter TP1 is applied which has a frequency that is dependent on the speed at which the toothed periphery of the toothed disc (not show) passes by the coil 3 of the sensor 2. Superimposed on the signal I1 is herein moreover an oscillation of comparatively low frequency, for example, a few hertz, which would render the processing and evaluation by conventional circuit configuration very difficult.

At the input E6 of the second impedance transformer, that is at the output of the low-pass filter TP2, the inventively used reference signal I2 is applied which, as is shown in FIG. 3, represents the slow, low-frequency change of the signal I1 which is superimposed by oscillations with the useful frequency only in a very attenuated fashion still. The diagrams according to FIGS. 2 and 3 have been measured simultaneously and are represented on the same scale against the same time axis.

Figure 4:
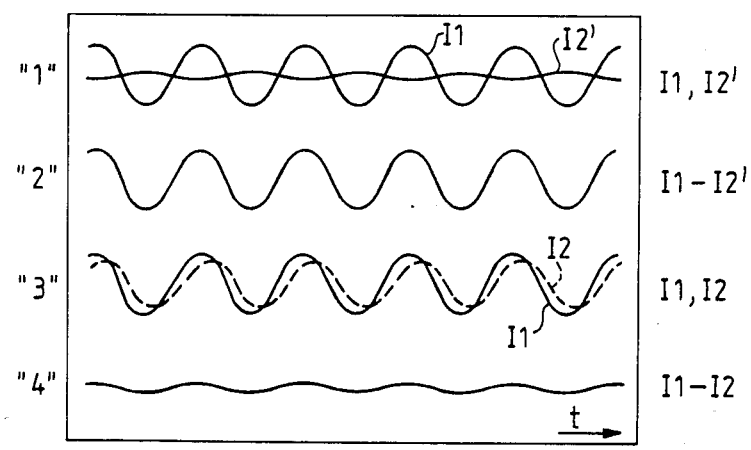
FIG. 4 shows alike the illustration of FIG. 2 and FIG. 3, yet on a different scale and with another sensor signal, a comparison of the signal courses at various test points of the circuit configuration according to FIG. 1.

FIG. 4 compares the signal courses at various points of the circuitry. For the sake of illustration, a situation with constant wheel speed has been chosen. The curve "1" shows the signal course I1 at input E5 and furthermore a signal course I2' which would have to be measured at input E6, if the adapter circuit 20, 21 were set out of function, that is, feedback of the signal via the resistor R26 were interrupted. The difference between these two signals would then look like curve "2". In consequence of the adapter circuit 20, 21 which causes dynamic follow-up of the reference signal, however, signal course "3" will result. The dotted characteristic curve depicts the reference signal I1 adapted by the follow-up so that now the difference I1–I2, illustrated in FIG. "4", becomes much less.

Figure 5:
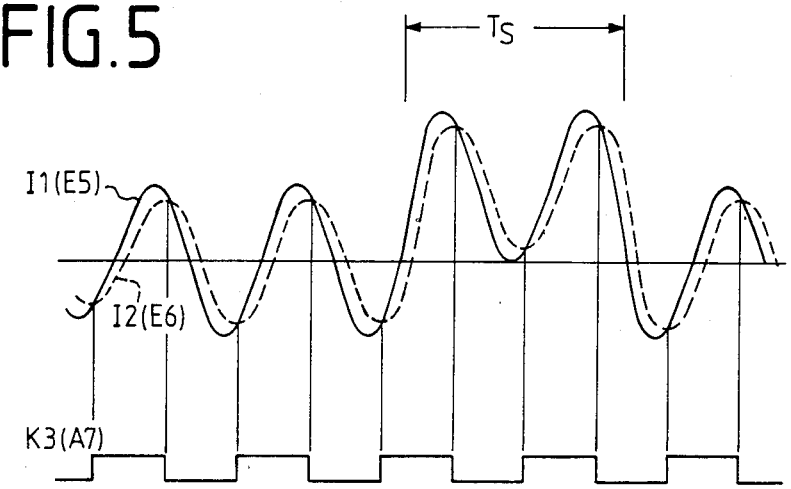
FIG. 5 is another diagram of the signal course at various test points of the circuit configuration according to FIG. 1; and, FIG. 6 is a schematically simplified illustration of a supplement circuit in conjunction with the circuit configuration according to FIG. 1.

FIG. 5 compares on an enlarged scale once more the signal courses I1 and I2 which can be measured both at the terminals E5, E6 and at A5, A6. In the example illustrated herein, there occurs for a short time an appreciable discrepancy of the sensor output voltage in the time span T$_S$, for instance due to tooth damage. However, owing to the inventive dynamic follow-up of the reference signal I2, this error will be eliminated when the sensor voltage is processed so that this impairment will not appear at output K2 of the processing circuit, as is shown by the binary output signal illustrated in FIG. 5.

Another vital advantage of the dynamic follow-up of the reference signal resides in that the limit frequency of the low-pass filter TP1 may be chosen to be relatively low to the end of attaining an effective attenuation of high-frequency interfering signals. In an embodiment of the present invention in which useful signals in the range of up to approximately 4 kilohertz were to be evaluate with the inventive circuitry, the limit frequency of the low-pass filter TP1 was determined to be 800 hertz. The use of a like low-pass filter, however, has as a result great attenuation of the useful signals above the limit frequency, that means in the frequency range between 800 hertz and 4 kilohertz. Low-frequency interfering signals which originate for instance from the eccentric support of the sensor's toothed wheel mentioned before (such eccentricities being present in in practical operations) and whose frequencies are below the limit frequency of the low-pass filter TP1 are emphasized by a like dimensioning of the low-pass filter. In the event of a useful signal of four kilohertz which was induced by a generating gear wheel with 100 teeth, the frequency of the low-frequency interfering signal caused due to the eccentric support is roughly 40 hertz. Because of the inventive dynamic follow-up which was illustrated by way of FIGS. 4 and 5, the reference signal follows the useful signal so that, in spite of the great attenuation of the useful signal by the low-pass filter TP1, there is ensured proper evaluation of the useful signal and, respectively, conversion into a corresponding square-wave signal at output A7 of the comparator 7. Without the follow-up circuit described, the limit frequency of the low-pass filter TP1 would have to range considerably higher, namely in the range of the maximum useful frequency, what would have as a consequency much greater susceptibility to high-frequency interfering pulses.

Figure 6:
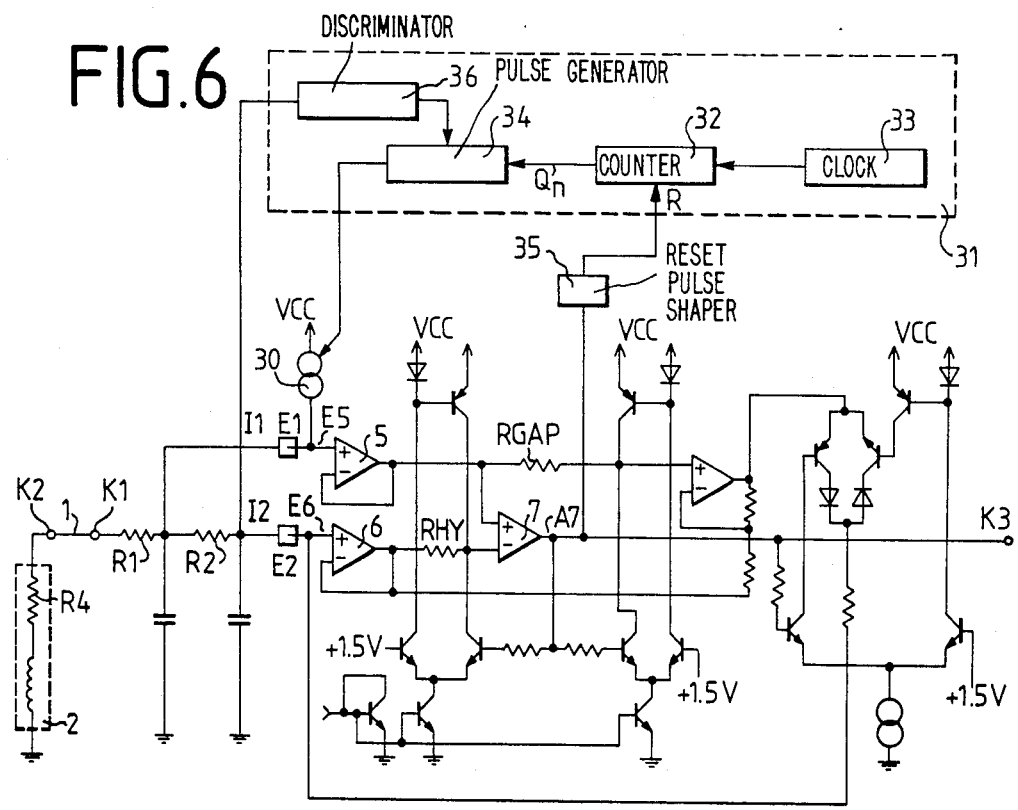

FIG. 6 illustrates the circuit configuration explained already with regard to FIG. 1 in conjunction with an additional monitoring circuit 31.

This supplement circuit first of all comprises a counter 32 which is driven by an oscillator or clock generator 33 and which is constantly stepped. As soon as a predefined digit $Q_n$ is reached, this will cause triggering of a pulse which is delivered by a pulse generator 34 by way of the constant current source 30 (see FIG. 1) into the input circuit of the monitoring circuit. The evaluating circuit reacts similarly like on a useful signal. A difference in voltage will be caused at the inputs E5, E6 which difference, via the impedance transformers 5, 6, leads to change-over of the comparator 7. As there is connection between output A7 of the comparator 7 with the counter 32 via an adapting step 35 which depending on the special design of the circuitry brings about differentiation of the signal, deceleration or negation, the pulse at A7 will drive the reset input R and thereby reset the counter 32. The counting action $Q_n$ will start anew. The entire structure, that means the described components of the supplement circuit 31 and the evaluating circuit, hence represents an oscillator which (as long as no dominant signal of the rotational speed sensor 2 is fed) oscillates with a predetermined inherent frequency. The frequency is below the useful frequency range. An interruption of the inherent oscillation would indicate a defect.

The supplement circuit 31 also serves to detect an interruption or a short-circuit in the signal path from the rotational speed sensor 2 to the evaluating circuit. For this purpose, the distribution of voltage will be monitored which is caused by the current introduced with the aid of the constant current source 30 on the resistors R1, R2 in consideration of the internal resistance R4 of the sensor 2. A voltage-mirror discriminator 36 is to this end connected to the reference-signal input E2 and prevents, when the voltage at input E2 falls out the predetermined 'window', a pulse issuance from the supplement circuit 31 into the constant current source 30. For this purpose, the discriminator 36 is connected to the enable input of the pulse generator 34. Consequently, a short-circuit or an interruption of the sensor connection results likewise in stopping of the inherent oscillation generated through the circuit 31.

What is claimed is:

1. A circuit configuration for processing the output signal of a rotational speed sensor which provides an alternating voltage signal comprising a low-pass filter input circuit for attenuating high-frequency interfering signals and comprising amplifying and pulse-generating circuits, wherein a smoothing filter (TP1, TP2, 5, 6) is inserted into the input circuit between the rotational speed sensor (2) and the amplifying and pulse-generating circuits, which smoothing filter contains a first low-pass filter (TP1) for attenuating the high-frequency interfering signals and forming a useful signal (I1), a second low-pass filter (TP2) for obtaining a reference signal, and wherein the signals obtained by means said low-pass filters, namely the useful signal and the reference signal, are fed to a comparator (7) whose output signal represents the processed sensor signal;

wherein the second low-pass filter (TP2) for the formation of said reference signal (I2) has a limit frequency which is below the lowest useful frequency of the sensor signal;

wherein the first low-pass filter (TP1) for the attenuation of the high-frequency interfering signals has a limit frequency which is in the useful frequency range and is chosen such that the amplitudes of the useful signals (I1) are approximately the same above the limit frequency;

wherein the useful signal (I1) and the reference signal (I2) are fed to the two inputs of the comparator (7);

wherein impedance transformers (5, 6) are respectively inserted between the low-pass filters and the comparator (7); and, wherein a first resistor (RHY) is interposed in the signal lines between the impedance transformer (6) and the comparator (7), on which resistor a difference voltage can be generated by means of a first difference amplifier (8) controlled by the output signal of the comparator (7) and by means of a first current mirror circuitry (9), which difference voltage is opposed to the actuating signal of the comparator (7), that is the difference (I1, I2) between the useful signal and the reference signal, and thereby cause a switching hysteresis.

2. A circuit configuration as claimed in claim 1, wherein the reference signal (I2) is variable in dependence on the amplitude of the useful signal (I1).

3. A circuit configuration as claimed in claim 2, wherein the reference signal (I2) can dynamically follow the useful signal (I1) by means of an adapter circuit (20, 21) which starts to function after a predetermined threshold value, that is the difference value between the useful signal and the reference signal, has been exceeded.

4. A circuit configuration as claimed in claim 2, wherein to generate the threshold difference value, decisive for the follow-up, a second resistor (RGAP) is inserted into the signal line leading to the adapter circuit (20, 21), on which resistor a threshold voltage opposing the useful signal (I1) can be generated by means of a second current mirror circuitry (15) and a second difference amplifier (14) controlled by the output signal of the comparator (7) which compares useful signal and reference signal.

5. A circuit configuration as claimed in claim 4, wherein the adapter circuit (20, 21) comprises an amplifier (20) which, by way of a network (21) connected downstream, generates a control variable which is dependent on the difference between the useful signal level and the reference signal level and which can be fed back to the second low-pass filter circuit (TP2, 6) forming the reference signal (I2).

6. A circuit configuration as claimed in claim 5, wherein for self-monitoring the circuit operability; a supplement circuit (31) is provided which initiates inherent oscillation of the evaluating circuit with a frequency that is below the useful frequency range.

7. A circuit configuration as claimed in claim 6, wherein the occurrence of a short-circuit or an interruption of a signal line (1) leading to the rotational speed senor (2) prevents the inherent oscillation.

8. A circuit configuration as claimed in claim 6, wherein the supplement circuit (31) comprises a counter (32) constantly stepped by means of an oscillator or clock generator (33), which counter can be reset by the output signal of the digital comparator (7) and which, on attainment of a predetermined digit (Qn), will introduce by way of a pulse generator (34) a pulse similar to a useful signal into the input circuit and thereby will initiate a pulse that resets the counter (32).

9. A circuit configuration as claimed in claim 8, wherein a constant current source (30) is provided which causes a distribution of voltage in an input network which, in the event of either interruption of the signal line (1) leading to the rotational speed sensor (2) or a short-circuit, will exceed limit values and thereby prevent at least one of the inherent oscillation and the delivery of pulses into the input circuit.

* * * * *